United States Patent
Spandau

[15] 3,641,771
[45] Feb. 15, 1972

[54] APPARATUS AND METHOD FOR CONFINING AND COLLECTING OIL FLOATING ON A WATER SURFACE

[72] Inventor: Howard D. Spandau, Houston, Tex.

[73] Assignees: David M. Johnson; Robert L. Fleming, , part interest to each

[22] Filed: Aug. 14, 1969

[21] Appl. No.: 849,985

[52] U.S. Cl............................................................61/1 F
[51] Int. Cl.......................................................E02b 15/04
[58] Field of Search .........................................61/1, 1 F, 5, 6

[56] References Cited

UNITED STATES PATENTS

| | | | |
|---|---|---|---|
| 1,004,718 | 10/1911 | Wieland | 61/1 F X |
| 3,369,664 | 2/1968 | Dahan | 61/1 F X |
| 3,503,214 | 3/1970 | Desty et al. | 61/1 F |
| 3,050,750 | 8/1962 | Harrison | 61/1 F X |
| 3,318,098 | 5/1967 | Hoddinott et al. | 61/1 F |
| 3,494,132 | 2/1970 | Logan | 61/1 F |

FOREIGN PATENTS OR APPLICATIONS

| | | | |
|---|---|---|---|
| 54,003 | 6/1922 | Great Britain | 61/1 F |
| 1,118,333 | 7/1968 | Great Britain | 61/5 |

*Primary Examiner*—Peter M. Caun
*Attorney*—Ralph R. Browning

[57] ABSTRACT

A series of gas inflated bodies are secured end-to-end to form a buoyant toroidal barrier which confines oil floating within the area circumscribed by the barrier. Each of the bodies includes a coupling means which secures adjacent bodies together in a leakproof seal and also acts as a harness structure for anchoring the composite toroidal body in place. Water and/or oil may be placed inside the inflated bodies to act as ballast and to provide storage for oil.

In a modified form, a number of the inflated bodies are secured to each other and attached to the main barrier to form a lock which permits vessels to enter or leave the circumscribed area without loss of any of the confined oil.

5 Claims, 14 Drawing Figures

PATENTED FEB 15 1972

Howard D. Spandau
INVENTOR

BY Ralph R. Browning

ATTORNEY

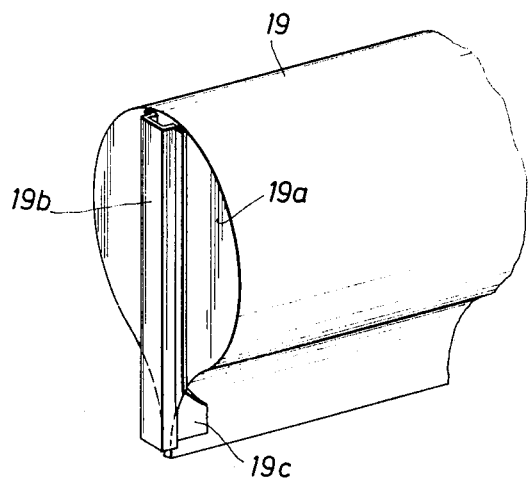
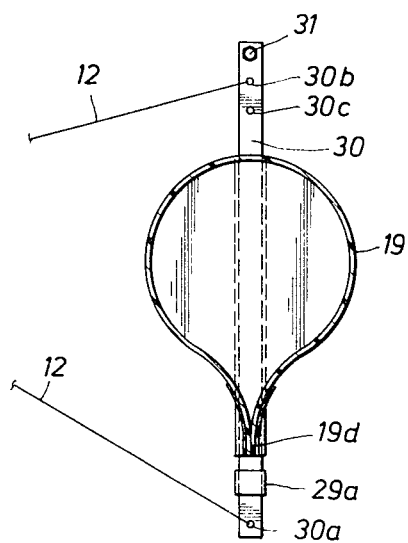
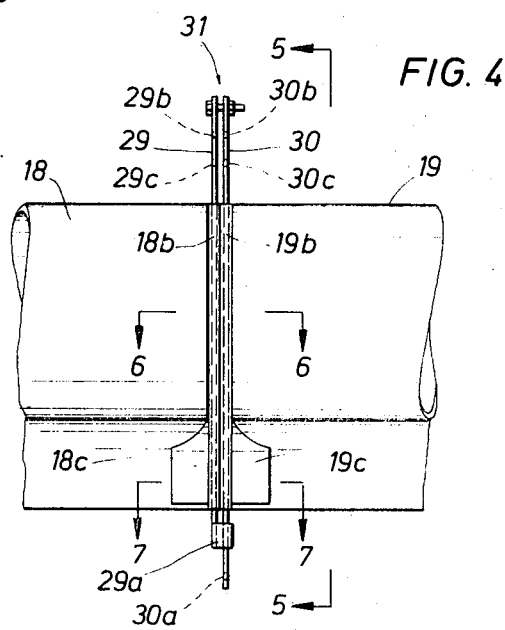
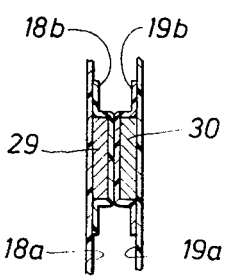
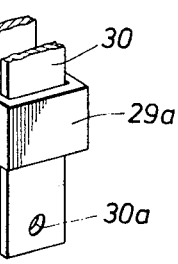

Howard D. Spandau
INVENTOR

BY *Ralph H. Browning*

ATTORNEY

APPARATUS AND METHOD FOR CONFINING AND COLLECTING OIL FLOATING ON A WATER SURFACE

BACKGROUND OF THE INVENTION

1. Field of the Invention

The present invention relates generally to an apparatus and method for confining oil or other buoyant materials on the surface of a body of water or other fluid denser than the buoyant material and for providing temporary storage of such oil or other buoyant material. More particularly, the present invention relates to an apparatus and method for confining and storing oil which may escape from a subsurface formation or pipeline or the like underlying a body of water for the purpose of preserving such oil and to prevent it from polluting or otherwise damaging water life, beaches and property. Reference to "oil" and "water" will be understood to be exemplary of buoyant and more dense fluid respectively with which the invention is usable.

2. Brief Description of the Prior Art

The prior art includes a variety of devices and techniques proposed for the purpose of confining water-borne oil and other buoyant materials. One such device includes a large flexible sheet with weighted ends. Air is pumped between the water and the sheet to form a huge bubble within which oil may be confined. The difficulty associated with handling and inflating such a device and its rather fragile nature are evident.

Another prior art teaching contemplates the use of an open-ended buoyant steel structure with a tubular hull. The structure is designed to be positioned over a submarine oil leak to entrap oil entering the lower opening of the tubular hull structure. While such a device may be suitable for small leaks, various practical size limitations are imposed by the use of a rigid structure. Moreover, even assuming such a device could be constructed with dimensions large enough to confine oil over a large water area, it would be extremely difficult to transport the device from location to location rapidly, as by air, when urgently needed at a new location, and the device would be impractical for use in shallow or inaccessible waters. Yet another problem associated with a rigid, single-piece structure is that it cannot readily be employed to encircle a drilling or production facility where serious oil leakage is most likely to occur.

Two prior art devices are known to have been suggested which include flotation means employed to suspend a flexible subsurface barrier in the form of a skirt. One of such devices employs a continuous, weighted fin suspended from foamed polyethylene floats while the other employs a weighted skirt of canvas suspended from inflated floats. The floats in both of these latter devices are spaced from each other and are connected only by means of the flexible barrier material. The described construction renders the barriers subject to bending and dipping under the influence of wind and wave action which may result in loss of any oil confined within the barriers. In addition, neither of such prior art devices provide any means for permitting vessels to cross the floating barrier to service an encircled facility. Moreover, since it may be necessary to airlift the barriers to distant offshore installations, it will be evident that the use of solid floats is undesirable to the extent that such floats occupy a relatively large storage space and are bulky and difficult to handle.

SUMMARY OF THE INVENTION

A continuous, buoyant body preferably in the form of a toroid is employed to confine oil or other material floating on a water surface. The floating material appearing on the encircled area of water is prevented from escaping the area by the buoyant toroidal body which forms a surface and a subsurface barrier.

In a preferred embodiment, the body of the barrier is formed from a series of similar gas inflated segments which are connected end to end. Each of the segments is constructed of a flexible material and is in the form of a slightly arcuate, tubular section with closed ends. The cross section of each segment is preferably substantially teardrop shaped and includes a downwardly extending tapered section designed to ride below the water surface to provide a subsurface barrier. When the segments are assembled, the resulting surface and subsurface barrier is continuous along its length. The segments are inflated with gas to provide the desired buoyancy and, if desired, may contain water ballast to partially submerge the segments for the purpose of lowering the effective depth of the underwater barrier and to stabilize or control the floating characteristics of the composite toroidal body. If desired or necessary, the segments of the toroidal body may be employed as storage containers for oil removed from the area circumscribed by the toroidal body.

Releaseable coupling means secure the segments together and form a leakproof connection between adjoining segments. The coupling means also acts as a harness structure for anchor lines which may be employed to hold the toroidal body in place.

The oil confining structure of the present invention may be positioned about an offshore oil production or drilling rig to confine oil escaping from the subsurface formation due to drilling activities or from a break in a production line. The coupling means employed in the present invention permits the toroidal body to be disconnected at any segment to provide free passage of barges and other vessels to and from the surrounded oil rig.

An important feature of the present invention is its ability to be quickly disassembled and deflated. The deflated segments occupy a relatively small space and are capable of being transported by aircraft to the desired location where they may be quickly and easily reinflated and assembled.

From the foregoing it may be appreciated that the confining means of the present invention eliminates the need for a separate, weighted skirt or other similar means for providing the desired subsurface barrier. Moreover, the flexibility and design of the barrier of the present invention permits it to assume relatively large dimensions and to encircle large areas of water. These latter features as well as others permit the number of segments employed to be increased or reduced to respectively increase or reduce the circumscribed water area with only minor sidewall distortion in the resulting barrier. The internal storage capabilities of the component segments of the barrier also permit it to be ballasted with water to ensure proper buoyancy and subsurface barrier depth and to act as a temporary storage means for oil.

In a modified form of the invention, a plurality of the segments are secured together and attached to the primary barrier to form a secondary barrier or lock. Coupling means such as those employed on the primary barrier permit the lock to be disconnected at any segment to provide free passage of vessels into and out of the lock. With the lock closed, the primary barrier may be disconnected to permit passage into or out of the primary confined area without losing any oil which may flow from the confined area into the lock.

These and other features and advantages will become evident from the following detailed description of the preferred embodiments of the apparatus and method of the invention.

BRIEF DESCRIPTION OF THE DRAWINGS

FIG. 3 is a perspective view illustrating the end portion of one of the component segments forming the apparatus of the present invention;

FIG. 4 is a front elevation of a portion of the present invention illustrating details in the coupling means employed to join adjacent segments of the apparatus together;

FIG. 5 is a cross section taken along the line 5—5 of FIG. 4;

FIG. 6 is a cross section taken along the line 6—6 of FIG. 4 illustrating certain details in the end coupling means of the present invention;

FIG. 7 is a cross section taken along the line 7—7 of FIG. 4 illustrating additional details in the end coupling means of the present invention;

FIG. 8 is a perspective view of the lower portion of the end coupling means employed in the present invention;

DESCRIPTION OF THE PREFERRED EMBODIMENTS

Figure 1:
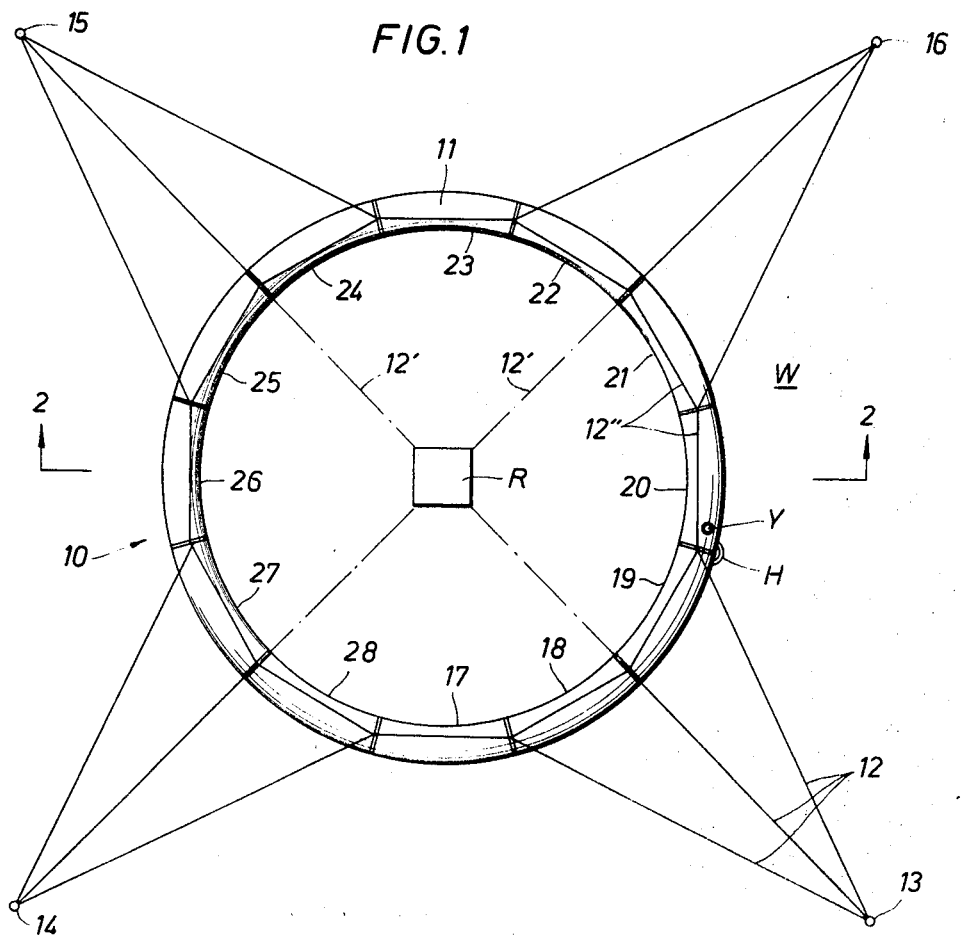
FIG. 1 is an overhead view of the apparatus of the present invention anchored in position on the surface of a body of water.

FIG. 1 illustrates a preferred form of the apparatus of the present invention, indicated generally at 10, floating on the surface of a body of water W and surrounding an oil production or drilling rig R. The apparatus 10 includes a substantially toroidal body 11 which is adapted to confine oil or other buoyant material within an area C circumscribed by the toroidal body 11. Securing lines 12 extend between the body 11 and a plurality of suitably spaced anchor means 13—16 to fix the body 11 in position about the rig R. If desired, additional securing lines, such as the lines 12' may be secured between the rig R and the body 11.

The toroidal body 11 of the present invention is a composite structure formed from a plurality of like segments 17—28 coupled together at their ends to form a closed, substantially toroidal body. Each of the segments of the body 11 comprises an inflatable, baglike structure and includes releaseable coupling means at both of its ends for securing adjoining segments to each other and for providing a harness structure to which the securing lines 12 may be attached. If desired or necessary, connecting lines 12'' may also be secured to the coupling means above and/or below the body 11 for maintaining the desired circular configuration and for reducing the stress imposed on the body by the securing lines 12 and 12'.

With reference to FIGS. 2A–2D, it may be seen that each of the segments 17–28 of the body 11 includes an outer body 11a constructed of a flexible, airtight material such as rubber or polyethylene or other suitable material. Each segment is slightly arcuate along its length and is substantially teardrop shaped in cross section with such cross section including a downwardly tapered lower portion 11b and a substantially circular upper portion 11c which meet to enclose an internal area 11d. The tapered portion 11b of each section extends below the surface of the water W to form a subsurface barrier and thereby ensure adequate containment of the oil or other material contained within the circumscribed area C.

Figure 2A:
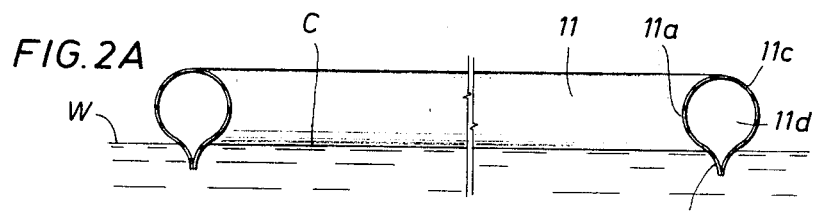
FIGS. 2A–2D are cross sections of the apparatus of the present invention taken along the line 2—2 of FIG. 1 with FIG. 2A illustrating air inflation of the apparatus, FIG. 2B illustrating air inflation and water ballast, FIG. 2C illustrating air inflation with water ballast and partial oil storage and FIG. 2D illustrating differential air inflation, water ballast and oil storage.
Figure 2B:
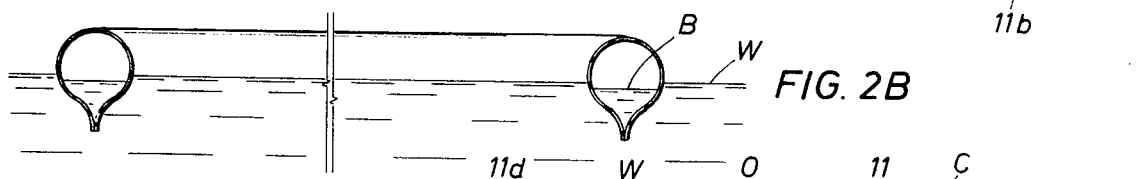
Figure 2C:
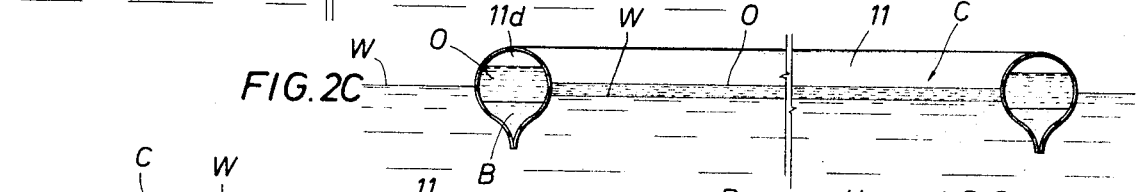

In accordance with the teachings of the present invention, the buoyancy of the toroidal body 11 may be controlled to alter its floating depth and the effective submergence or depth of the underwater barrier formed by the submerged portion of the body. Thus, with reference to FIG. 2A, maximum buoyancy is achieved by inflating the enclosed area 11d of each segment with air or other suitable gas resulting in only partial submersion of the toroidal body 11. Where a deeper subsurface barrier is required, the enclosed area 11d of each of the segments may be filled with air and a ballast of water B to further submerge the body 11 as illustrated in FIG. 2B. It will be understood that any suitable valve means V (FIG. 1) may be employed for inflating the segments with air or other gas or for partially filling them with fluid. It will also be understood that, if desired, suitable gas connecting hoses H or other means may be connected between some or all of the adjoining segments to permit groups of more than one or the entire toroidal body to be inflated from a single inlet valve. In addition, any suitable means may be employed to connect adjacent segments whereby fluids may be introduced into groups of more than one or all segments through a single inlet. Such air and fluid connecting means which have been shown only at exemplary points are preferably of the type which may be easily connected and disconnected to permit the segments to be completely disconnected from each other when desired.

Under certain conditions, it may be desirable to store oil within the enclosed area 11d. Thus, with reference to FIG. 2C, it may be necessary or desirable to reduce the level of the oil O collected within the circumscribed area C. In the latter event, oil O may be pumped into the enclosed area 11d of each segment with the remainder of the area 11d being filled with air and any desired amount of water ballast B.

Figure 2D:
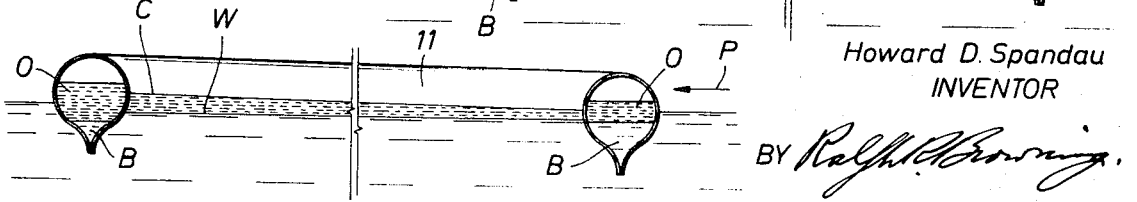

Depending upon water and wind conditions, it may be desirable to dispose different amounts of oil and/or water in the various segments of the body 11. Thus, by way of example and with reference to FIG. 2D, the segments on the right side of the body 11 have been filled with more water ballast B than those on the left side of the body to thereby reduce the displacement force exerted by a prevailing wind traveling in the direction indicated by the arrow P. Since the wind force tends to increase the oil level along the left side of the body 11, the configuration illustrated in FIG. 2D is designed to permit the left side of the body 11 to ride higher above the water's surface which thereby increases the effective height of the barrier.

As has previously been indicated, the apparatus 10 of the present invention may be employed to encircle a water bound oil facility which may often be located some distance out to sea. For this reason as well as others, it is desirable to form the toroidal body 11 from a series of collapsible sections which occupy relatively little space and may easily be transported by air or other means to a remote location, inflated and coupled together to encircle a large area of water. The coupling means also permits the body to be separated as required to permit the passage of barges and service vessels to and from a facility enclosed by the toroidal body 11.

Details in the construction of the preferred form of the coupling means employed to join the individual segments together are illustrated in FIGS. 3–8. FIG. 3 illustrates one end of a segment such as the segment 19 which includes a substantially flat end surface 19a or at least having substantially straight vertical elements, to which is connected a vertically extending sleeve or pocket 19b. With reference to FIGS. 3 and 7, the lower portion of the sleeve or pocket 19b is secured to the segment 19 by means of tabs 19c which extend from the sleeve and are attached to either side of the tapered portion of segment 19. The sleeve 19b and tab 19c may be constructed of rubber, polyethylene or any other suitable material and are secured to the segment 19 by an appropriate adhesive, heat bonding or any other suitable securing means. In the preferred form of the invention, the outer body of each segment is constructed in the form of a continuous sheet doubled back on itself and sealed at 19d (FIG. 7) by any suitable bonding or sealing means. The end covering 19a may be integrally formed with the main body of the segment 19 or may be a separate piece suitably bonded or sealed thereto.

Referring to FIGS. 4 and 7, the end portions of two adjoining segments, such as segments 18 and 19 are illustrated as they appear when coupled together. The end construction of segment 18 is similar to that of segment 19 and includes a vertically extending sleeve or pocket 18b and tabs 18c secured respectively to the end 18a and tapered sides of segment 18 in the manner previously described with reference to segment 19. It will be appreciated that the structure of the right end of each segment is similar to that described with specific reference to section 18 and that the left end of each segment is similar to that described for segment 19 and the two may or may not be identical. Two coupling bars 29 and 30 constructed of steel or other suitable relatively rigid material are inserted through the sleeves or pockets 18b and 19b respectively and extend vertically above and below the segments for mechanically linking the two segments together. In the preferred form of the invention, the bar 29 is preferably secured to the sleeve 18b by means of an adhesive or other suitable means while the bar 30 is free to move axially through the sleeve 19b. The bars 29 and 30 are joined together at their top ends by a nut and bolt assembly 31 and are secured to each other at their bottom ends by means of a keeper loop 29a which is secured to the bar 29 and encircles the bar 30. By tightening the nut and bolt assembly 31, the sleeves 19b and 18b are tightly pressed to each other with their outer surfaces sealingly pressed and held against each other as illustrated in FIGS. 4 and 6 to form a leakproof coupling between the adjoining segments 18 and 19 throughout the vertical extent of sleeves 18b and 19b.

As best illustrated in FIG. 8, the bar 30 extends below the keeper loop 29a and is equipped with a lower anchoring hole 30a to which the previously mentioned securing lines 12 may be attached. Additional anchoring holes 29b and 29c and 30b and 30c illustrated in FIG. 4 extend through the upper ends of the bars 29 and 30 respectively to form an upper attachment means for the securing lines 12. FIG. 5 illustrates a bridlelike attachment of lines 12 to both the top and bottom ends of the bars 29 and 30 which provides a balanced anchoring force and prevents twisting of the segments.

In employing the apparatus of the present invention, all or a portion of the segments 17-28 are disconnected from each other and each segment is deflated to conserve space. The deflated segments are then transported by air or other means to the desired location and are then inflated with the assistance of an air compressor or any other suitable source of compressed gas. The bar 30 is then inserted through the appropriate sleeve on each uncoupled segment and the lower end of the bar is passed through the keeper loop 29a carried by the segment with which it is to be joined. The nut and bolt assembly 31 is then employed to tighten the two bars together forming the desired leakproof coupling between the segments.

The foregoing procedure is repeated until the segments meet to form the closed toroidal body 11. Lines 12 are then secured to suitable anchoring means and attached to the harness structure formed by the bars 29 and 30 to hold the body 11 in the desired location. If desired or necessary, the lines 12' may also be secured between the rig R and the harness structure to assist in anchoring the body 11 in place. It should be noted that the number and position of anchoring points may be altered as desired. In addition, the anchor points 13-16 may be permanently fixed to the bottom of the water area or may be weights or other means which rest on the water bottom. It is also within the contemplation of the present invention to employ any other means for securing the position of the body 11 or for holding the body in any desired circular or noncircular configuration. In addition one or more conventional floats may be employed to support the lines 12 and/or 12' to prevent the lines from weighing down the body 11 and to permit the body 11 to ride freely on a rough water surface.

With the body 11 thus positioned, any oil seeping up through the well structure or lost overboard from the rig will rise to or float on the water surface, and all oil or other floating material appearing in the area C will be contained by the body 11. If for any reason, the depth of the subsurface barrier formed by the body 11 is to be increased, water may be pumped into each of the segments as required to further submerge the body. Where wind or water conditions require differential buoyancy, the floating depth of any segment of the body 11 may be controlled by pumping varying amounts of water into each segment. As oil is accumulated within the area C, it may be pumped into a barge or other vessel and transported to land. Where no such vessel is available or when otherwise desired, the oil may be pumped into the segments of the body 11 which may serve as temporary storage means. In the latter event, little or no water ballast is required in the segments and substantial amounts of oil may be stored within the body 11, it being understood that the body 11 remains buoyant even when containing large amounts of oil since the oil is lighter than water.

Where the oil leakage is from a submerged pipe line or a fractured formation, the body 11 may be assembled over the leakage area and held in position by boats or other means until the leakage has been stopped. In the latter event, it may be desirable to tow the body 11 and the trapped oil to another location for disposal or recovery. Here again, the individual segments of the body 11 may be properly ballasted to ensure effective containment of the entrapped oil while the body 11 is under tow. When oil is stored inside the body 11 and little or no oil remains within the enclosed area C, it may be desirable to disconnect two adjoining segments and tow the body 11 to port. In the latter event, the body 11 would form a single line if towed from one end or a double line if towed from its midlength. It will also be understood that where circumstances permit, the body 11 may be towed from location to location in its assembled form rather than having to be disassembled and subsequently reassembled at each new location.

The dimensions of the body 11 are of course subject to variation but where a toroidal barrier is to be formed, may include a major diameter of as much as 1,000 feet or more with the diameter of each segment being as much as 30 feet or more. It may also be desirable to employ a deflated barrier having segments with relatively small dimensions as an emergency device which may be quickly inflated and deployed about a leak. The emergency barrier thereafter may be replaced by a larger scale barrier.

It is also possible to embody the teachings of the present invention in forms other than the toroidal form specifically described herein. Thus the form of the barrier to be created in accordance with the teachings of the invention may be varied to best suit the problem to be solved and may include various curved and straight line configurations. By way of further example rather than limitation, the end surfaces of the segments may be slightly curved to better accommodate axial variation or distortion in the composite barrier formed by securing a plurality of segments together.

Figure 9:
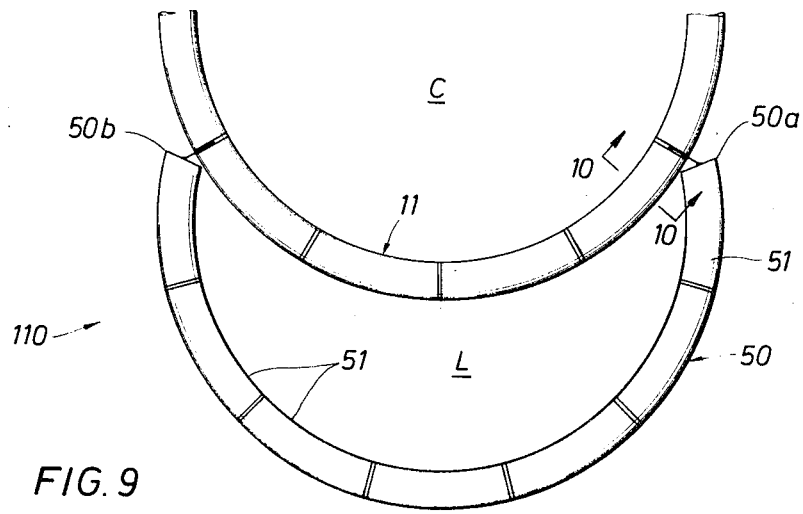
FIG. 9 is a partial overhead view of a modified form of the present invention illustrating a lock employed for preventing loss of buoyant material from the area confined by the main barrier.

FIG. 9 illustrates a modification 110 of the barrier of the present invention. The modified form of the invention includes a lock 50 constructed of a plurality of segments 51 each of which is similar to the segments 17-28 employed in the main body 11. The lock 50 is secured to the body 11 at 50a and 50b to form a secondary enclosed area L which prevents loss of oil confined within the area C while the main barrier 11 is separated as vessels enter and exit the area C. When a vessel is to enter the enclosed area C, two adjoining segments 51 of the lock 50 are separated, the vessel is moved into the lock area L and the segments are rejoined. Two adjoining segments in the main barrier 11 are then separated to permit the vessel to pass from the lock 50 into the primary confined area C with the lock preventing loss of any oil or buoyant material which may flow from the area C while the body 11 is opened. When a vessel is leaving the primary confined area C, the main barrier 11 is separated, the vessel is moved into the lock area L and the main barrier 11 is then closed back together. Any buoyant material entering the lock 50 from the area C during the exit procedure is pumped back into the main confined area C or into the buoyant segments or into any other suitable confining means. With the lock 50 free of buoyant material, it may then be opened to permit the vessel to leave.

Figure 10:
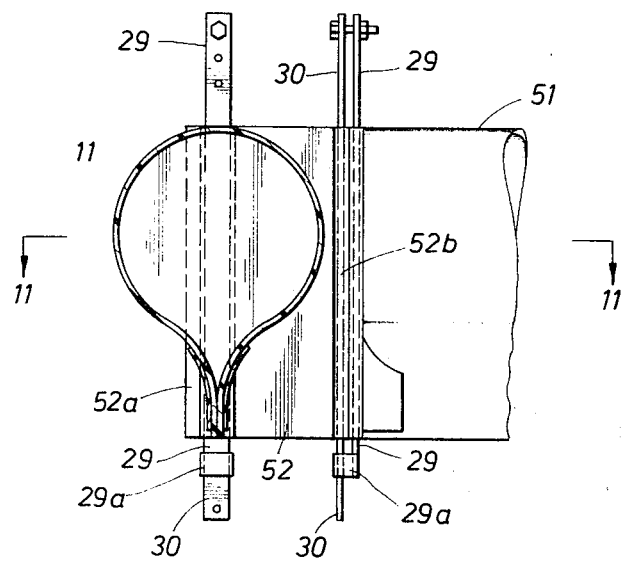
FIG. 10 is a cross section taken along the line 10—10 of FIG. 9 illustrating the preferred form of the securing means employed in attaching the lock to the main barrier.
Figure 11:
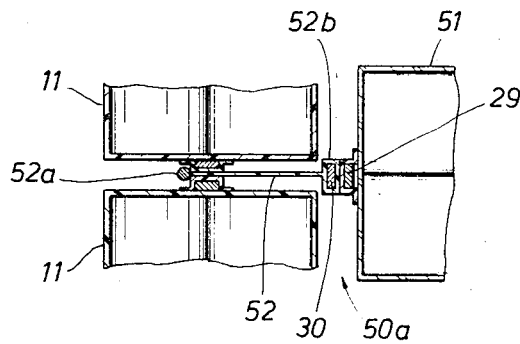
FIG. 11 is a cross section taken along the line 11—11 of FIG. 10.

FIGS. 10 and 11 illustrate details in the preferred means employed in securing the lock barrier 50 to the main barrier 11. The only modification required in the connecting structure between two adjoining segments in the main barrier 11 is the inclusion of a webb 52 which includes a vertically extending enlarged end piece 52a at one end and a vertical sleeve 52b at the other. The webb 52 is clamped between the bars 29 and 30 of the connecting means securing the two main barrier segments together and the enlarged end piece 52a acts to prevent the webb from pulling free from the connecting means. The sleeve 52b formed at the other end of the webb 52 is identical to that formed at the end of the individual segments whereby a segment 51 may be secured to the sleeve 52b in the same manner employed to secure any two adjoining segments together. From the foregoing, it will be understood that the means employed to secure the lock 50 to the main barrier 11 permits the use of the coupling means previously described with reference to securing the segments of the main barrier 11 and also permits the lock segments 51 to be interchangeable with the segments forming the main body 11.

The foregoing disclosure and description of the invention is illustrative and explanatory thereof, and various changes in the size, shape and material as well as in the details of the illustrated construction may be made within the scope of the appended claims without departing from the spirit of the invention.

I claim:

1. An apparatus for confining buoyant materials comprising a plurality of flexible inflatable bodies each of which when inflated includes first and second axially spaced end portions interconnected by a closed axially extending tubular portion with said tubular portion being substantially teardrop shaped in cross section, and securing means on each of said bodies adjacent each of said axially spaced end portions which is to be joined to an adjacent one of said bodies for securing said bodies together in end to end relation to one another, said securing means including a vertically extending pocket secured to each of said end portions which is to be joined to an adjacent one of said bodies and having a continuous external sealing surface facing away from the body on which it is mounted, an elongate bar extending through each of said pockets and further including connecting means for connecting together and urging toward one another bars extending through pockets attached to adjacent end portions of said bodies and holding the external sealing surfaces of said pockets in sealing engagement with one another.

2. The apparatus as defined in claim 1 wherein said securing means further include anchoring attachment means for attaching anchoring means to said body to fix said body in a given position on the surface of a body of water.

3. The apparatus as defined in claim 1 further including lock means connected with said confining barrier for forming a lock to prevent loss of any buoyant material confined by said confining barrier when said bodies forming said barrier are separated.

4. The apparatus as defined in claim 3 wherein said lock means is constructed from a plurality of said bodies secured to each other in end-to-end relationship.

5. The apparatus as defined in claim 1 including means by which some of said buoyant materials to be confined can be placed inside of said inflatable body for storage.

* * * * *